May 5, 1964 W. R. LONG 3,131,775
APPARATUS FOR EARTH WORKING
Filed Dec. 15, 1961 2 Sheets-Sheet 1

INVENTOR
WILLIAM R. LONG
BY
ATTORNEY

May 5, 1964  W. R. LONG  3,131,775
APPARATUS FOR EARTH WORKING
Filed Dec. 15, 1961  2 Sheets-Sheet 2
FIG. 3
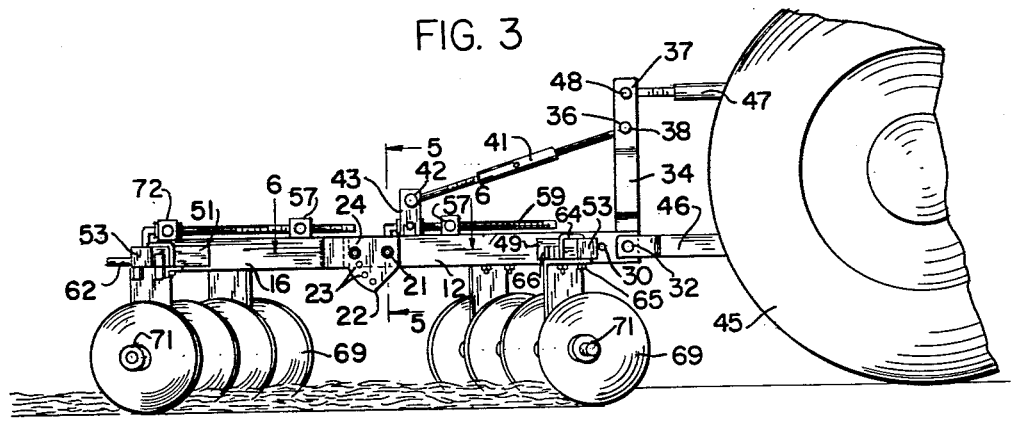
FIG. 4
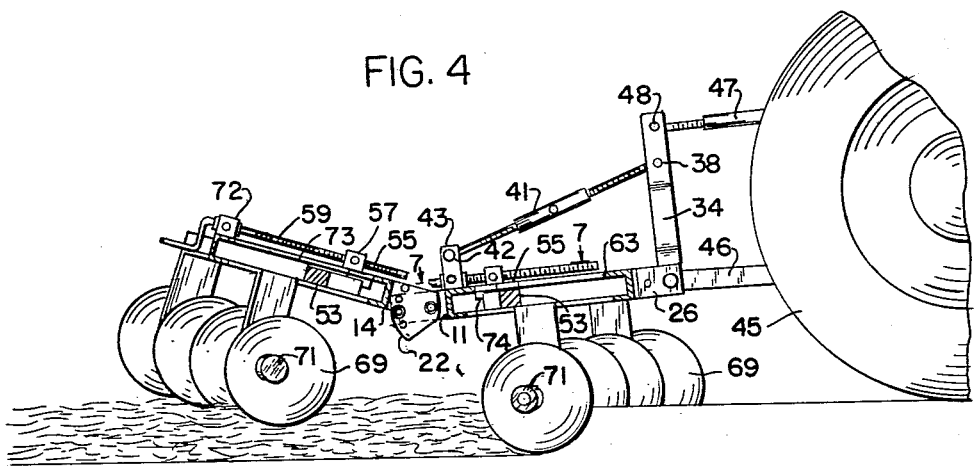
FIG. 5
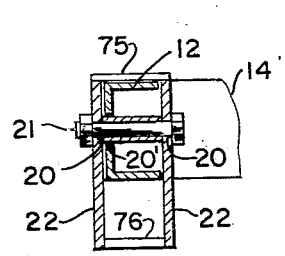
FIG. 6
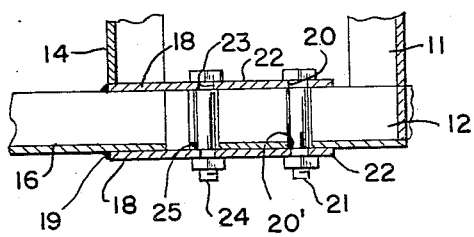
FIG. 7   FIG. 8
INVENTOR
WILLIAM R. LONG
BY
ATTORNEY

United States Patent Office 3,131,775
Patented May 5, 1964

3,131,775
APPARATUS FOR EARTH WORKING
William R. Long, Tarboro, N.C., assignor to Long
Manufacturing Company, Tarboro, N.C.
Filed Dec. 15, 1961, Ser. No. 159,627
2 Claims. (Cl. 172—640)

This invention relates to the cultivation of the soil and to implements and equipment by means of which the preparation of the soil and the cultivation is accomplished. The invention relates particularly to harrows and other earth working equipment having earth engaging implements which can be adjusted as to spacing, earth penetration, and as to elevation all as needed in the use of the same.

Various types of agricultural implements have been produced with limitations in various ways as to manufacture, utility, and use.

It is an object of the invention to provide a relatively simple, practical, earth working implement, of multiple earth engaging elements mounted on multiple frames for relative adjustment, and in a manner to be disposed in different angular, horizontal, and elevational positions, with certain of the earth engaging elements supported to penetrate an amount different from others, and with different weights applied hereto.

Another object of the invention is to provide an earth working device including a frame for attachment to a propelling vehicle, and which frame includes a relatively adjustable portion, with means for securing such portion in adjusted position relative to the remainder of the frame, and with earth engaging implements mounted for angular, width, and length adjustment as well as for the variation of weight on certain of such elements.

Figure 1:
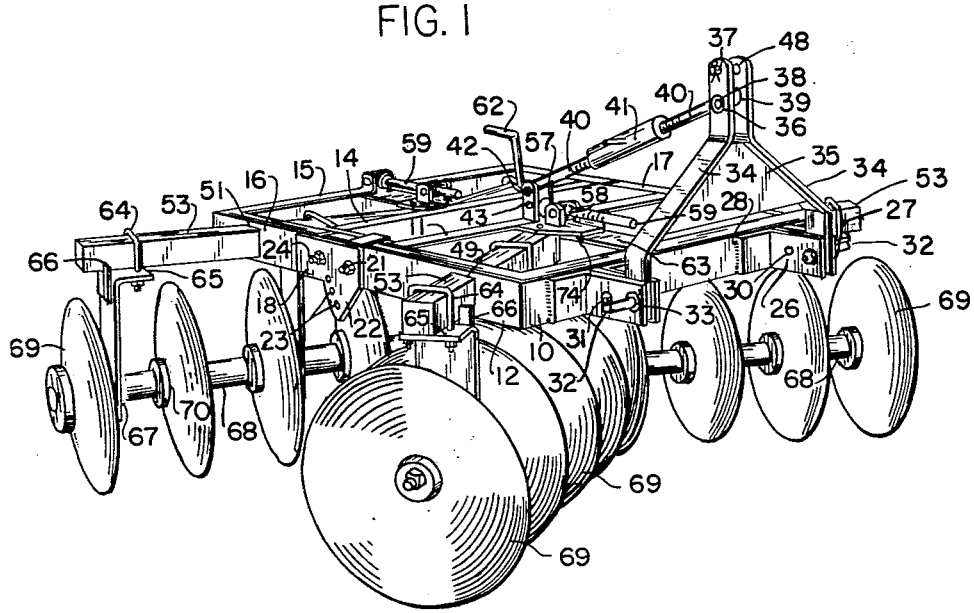
Figure 2:
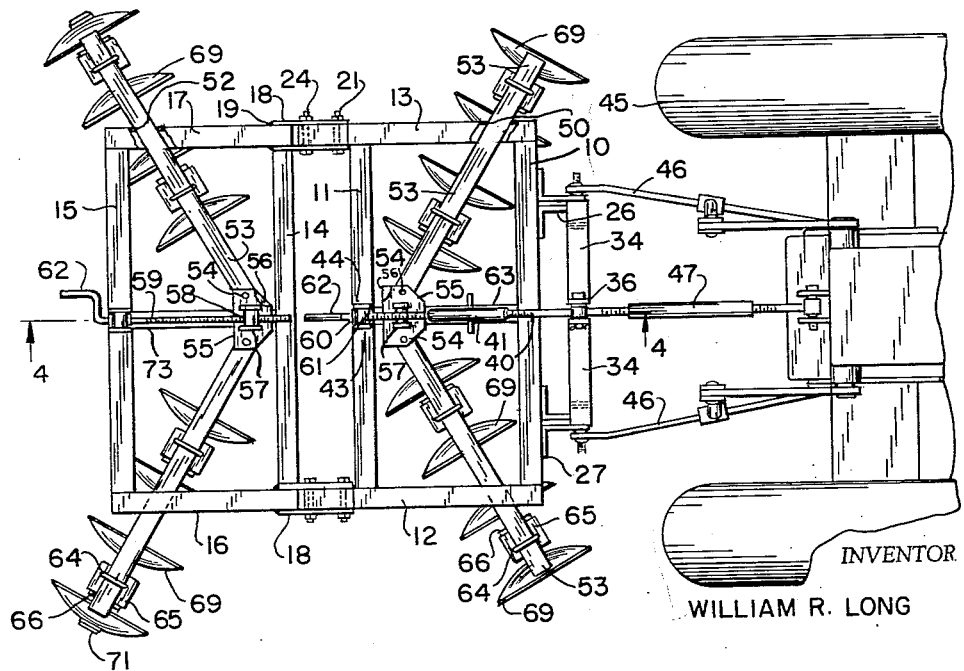

Other objects and advantages of the invention will be apparent from the following decription taken in conjunction with the accompanying drawings in which:

FIG. 1 is a perspective illustrating the invention as viewed from the front right-hand side;

FIG. 2, a top plan view showing the unit hooked up;

FIG. 3, a side elevational view illustrating the unit operated in a horizontal plane over soft dirt;

FIG. 4, a sectional view along the line 4—4 of FIG. 2 illustrating the invention set for a deep and shallow cut;

FIG. 5, a fragmentary sectional view along the line 5—5 of FIG. 3;

FIG. 6, a transverse fragmentary section through FIG. 3 looking toward the hinge or pivot;

FIG. 7, an enlarged longitudinal section along the line 7—7 of FIG. 4; and

FIG. 8, a section along the line 8—8 of FIG. 7.

Briefly stated, the invention comprises a pair of pivotally connected generally rectangular front and rear frame members, with means for supporting said frame members by the three-point hitch of a tractor, each frame having a beam extending through a fixed location beyond the sides thereof, with the contiguous ends of each pair of beams movable rearwardly and forwardly to vary the angularity of the beams, and having brackets slidably mouned lengthwise on the beams and carrying earth penetrating elements, the pivotal connection between the front and rear frames being such that one frame can be rotated on its pivot to elevate the earth penetrating elements beneath it and to vary their penetration as well as to add weight to the other frame and its earth penetrating elements.

With continued reference to the drawings, the invention comprises a generally rectangular front frame of channel or other construction with front and rear members 10 and 11 and right and left sides or members 12 and 13.

A second or rear frame of the same general character but somewhat smaller is located behind the first frame, such second frame including front and rear members 14 and 15 and right and left side members 16 and 17.

The front and rear frames are connected at each side by means of hinge plates 18 fixed by a weld 19 to the side of the rear frame, such plates each having a pivot opening 20 in its forward extremities in which is received a pivot pin forming bolt and nut 21 which extends through opening 20′ in the sides 12 and 13 of the front frame so that the plates and auxiliary frame can pivot about such bolts.

In order to fasten the rear frame in a fixed position relative to the front frame, the plates 18 are provided with a dependent quadrant forming portion 22 having spaced openings 23 in which a bolt and nut 24 are adapted to be received, such bolt and nut extending through an opening 25 in each of the side members 12 and 13. By removing the bolt and nut 24 adjustment can be made.

The front frame is provided with a pair of brackets 26 and 27 secured by welds 28 and 29 near the right end of the front member 10 and a similar pair of brackets 26 and 27 are mounted near the opposite end of the front member 10 and secured by welds 28 and 29. The brackets 26 and 27 are provided with spaced openings 30 and 31 for the receipt of pins 32 to which the lift arms of a tractor can be attached. These pins extend through an opening 33 in one end of a yoke composed of a pair of identical members 34, and which members are secured in fixed relation by means of a plate or gusset 35 with the upper ends of the yoke members disposed in spaced relation and provided with spaced openings 36 and 37. The openings 36 receive a bolt and nut 38 which extends through an eye 39 of an externally threaded member 40, connected by an internally threaded turnbuckle 41, to a similar corresponding second externally threaded member 40, in the eye 39 of which is received a bolt and nut 42 mounted in the upper ends of spaced bracket members 43 and 44, attached to the top flange of the rear frame member 11. The construction described is adapted to be supported by the three-point hitch of a conventional tractor 45, such three-point hitch comprising lift arms 46 and a connecting arm 47. The pins 32 attach to the lift arms 46 and the connecting arm 47 is connected by a pin 48 to the upper extremities of the yoke members 34.

In order to provide means for mounting the earth engaging elements, the side members 12 and 13 are provided with openings 49 and 50 and the side members 16 and 17 are provided with openings 51 and 52. In each of these openings is slidably disposed a beam or transverse member 53 the inner ends of which are connected by a pivot pin or bolt 54, each end of which extends through upper and lower plates 55 and 56, the upper plate 55 having spaced upstanding lugs 57, between which is mounted an internally threaded nut 58, in which is received an externally threaded shaft 59, having a shoulder 60, received in a collar 61, fixed between the bracket members 43 and 44. The outer end of the externally threaded shaft 59 is provided with a crank 62 so that by rotation of the crank and the threaded shaft, the nut 58 will be caused to travel lengthwise thereof and move the inner ends of the beams forwardly and rearwardly.

The upper and lower plates 55 and 56 are slidably mounted on a frame member 63 fixed at its front and rear ends to the frame members 10 and 11. Accordingly by rotation of the crank the inner ends of the beams 53 can be adjusted forwardly and rearwardly to vary the angularity of the beams.

Attached to the beams by means of U-bolts 64 are brackets 65 having upstanding lugs 66 to prevent the twisting of the brackets on the beams. The lower ends of the brackets receive bearings 67 which carry shafts 68 with discs 69 held thereon by means of spacing elements 70 and retainers 71.

There are only two of the U-bolts employed on each of the beams 53 and consequently maximum endwise adjustment of the earth engaging elements on the beams is possible. The beams in the rear frame have their inner ends mounted corresponding to those in the front frame for front and rear adjustment with the collars 61 being pivotally mounted in upstanding brackets 72. The upper and lower plates 55 and 56 are slidably mounted on a frame member 73, the plates 55 and 56 having inwardly projecting slideway forming flanges 74.

In order to limit the relative pivoting movement of the rear frame with regard to the front frame, stops 75 and 76 may be provided and with the corresponding transfer of weight from the rear frame to the front frame as the rear frame is elevated and the stops are approached.

It will be apparent from the foregoing that the invention may be attached to a propelling vehicle such as a tractor and used to perform the necessary earth treating operations, that the treatment of the earth may be equally done by the earth engaging elements on both the front and rear frames and with the earth working elements on the beams of the front and rear frames set at the desired angle and at the desired spacing. Also the rear frame can be elevated up to approximately 45° varying the depth of the cutting elements on the rear frame while transferring weight to the front frame and causing the cutting elements to penetrate at a slightly greater depth due to such weight.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. Apparatus for earth-working comprising a first generally rectangular frame, means for connecting said frame to a propelling vehicle for maintaining said frame in a substantially fixed planar position, a plurality of earth-working implements mounted on said frame, a second generally rectangular frame located in longitudinal alignment with said first frame, a plurality of earth-working implements mounted on said second frame, quadrant-forming members having free ends, said quadrant-forming members having portions extending downwardly below one frame, multiple tongues mounted on the other frame, each of said tongues having a base and a free end with an opening therethrough, pivot means connecting the free ends of said quadrant-forming members to the base of said tongues, each of said members having a series of spaced openings disposed radially of said pivotal connection, the openings of said members being alignable with the opening in the free end of said tongues, and pin means receivable within said aligned openings for maintaining said frames in fixed position relative to each other, whereby when said frames are connected substantially in alignment the earth-working implements of said first and second frames will penetrate the earth substantially the same amount and when said frames are disposed at an angle to each other a portion of the weight of one frame will be transferred to the other frame to cause the earth-working implements carried by each frame to penetrate the earth in varying amounts.

2. Apparatus for controlling the penetration into the earth of a plurality of earth-working implements comprising first and second generally rectangular frames, means for connecting said first frame to a propelling vehicle in a substantially fixed planar position, multiple tongues each fixed at one end to one of said frames and having a free end extending toward the other frame, a series of quadrant-forming members fixed to the other frame and extending toward said one frame, pivot means connecting the free ends of said quadrant-forming members to said tongues in spaced relation with the free ends thereof, said quadrant-forming members having downwardly extending portions with a series of openings therein disposed radially of said pivot means, each tongue having an opening adjacent to the free end and being selectively alignable with one of the radial openings of said quadrant-forming members, means receivable within said aligned openings for maintaining said frames in fixed position relative to each other, and earth-working implements carried by each of said frames, whereby said frames may be connected together substantially in alignment and the earth-working implements of each frame will penetrate the earth substantially the same amount or the frames may be connected at a selected angle to each other so that a portion of the weight of one frame will be transferred to the other frame to cause the earth-working implements carried by each frame to penetrate the earth in varying amounts.

References Cited in the file of this patent

UNITED STATES PATENTS

| | | |
|---|---|---|
| 2,640,307 | Robertson | June 2, 1953 |
| 2,897,905 | McClesky | Aug. 4, 1959 |